(12) United States Patent
Linn et al.

(10) Patent No.: US 11,738,813 B2
(45) Date of Patent: Aug. 29, 2023

(54) URETHANE HYBRID AGRICULTURAL VEHICLE TRACK

(71) Applicant: Loc Performance Products, LLC, Plymouth, MI (US)

(72) Inventors: Matthew A. Linn, Minster, OH (US); David Michael Burtchin, Elida, OH (US)

(73) Assignee: Loc Performance Products, LLC, Plymouth, MI (US)

( * ) Notice: Subject to any disclaimer, the term of this patent is extended or adjusted under 35 U.S.C. 154(b) by 985 days.

(21) Appl. No.: 16/656,672

(22) Filed: Oct. 18, 2019

(65) Prior Publication Data

US 2021/0114675 A1 Apr. 22, 2021
US 2023/0234653 A9 Jul. 27, 2023

Related U.S. Application Data

(63) Continuation-in-part of application No. 16/159,018, filed on Oct. 12, 2018, now Pat. No. 10,589,809, which is a continuation-in-part of application No. 15/340,011, filed on Nov. 1, 2016, now Pat. No. 10,099,734.

(51) Int. Cl.
*B62D 55/24* (2006.01)

(52) U.S. Cl.
CPC ................ *B62D 55/244* (2013.01)

(58) Field of Classification Search
CPC .................................................. B62D 55/244
See application file for complete search history.

(56) References Cited

U.S. PATENT DOCUMENTS

| | | | |
|---|---|---|---|
| 3,781,067 A | 12/1973 | Dodson et al. | |
| 3,871,067 A | 3/1975 | Bogardus et al. | |
| 4,433,634 A | 2/1984 | Coast | |
| 5,352,029 A | 10/1994 | Nagorcka | |
| 5,593,218 A | 1/1997 | Katoh et al. | |
| 5,984,438 A | 11/1999 | Tsunoda | |
| 6,536,852 B2 | 3/2003 | Katayama et al. | |
| 6,609,770 B2 | 8/2003 | Gauthier | |
| 6,974,195 B2 * | 12/2005 | Batistic | B60T 8/1755 303/146 |
| 6,974,196 B2 | 12/2005 | Gagne | |
| 10,099,734 B2 * | 10/2018 | Linn | C08G 18/7621 |
| 2003/0094854 A1 | 5/2003 | Rodgers et al. | |
| 2004/0130212 A1 | 7/2004 | Ishibashi | |

(Continued)

FOREIGN PATENT DOCUMENTS

| | | |
|---|---|---|
| EP | 1792811 A2 | 6/2007 |
| GB | 2229410 A | 9/1990 |

(Continued)

*Primary Examiner* — Tony H Winner
(74) *Attorney, Agent, or Firm* — Panagos Kennedy PLLC; Bill Panagos; Linda Kennedy

(57) ABSTRACT

An endless vehicle track includes a body having an outer surface and an inner surface. The outer surface includes a carcass and a series of ground engaging profiles longitudinally spaced along the outer surface. The inner surface includes a wheel path and a series of longitudinally spaced guide-drive lugs. One or more of the series of ground engaging profiles, the series of longitudinally spaced guide-drive lugs, the carcass and the wheel path comprise a urethane material.

15 Claims, 13 Drawing Sheets

(56) References Cited

U.S. PATENT DOCUMENTS

| | | |
|---|---|---|
| 2005/0253453 A1 | 11/2005 | Miller |
| 2007/0126286 A1 | 6/2007 | Feldmann et al. |
| 2008/0136255 A1 | 6/2008 | Feldmann |
| 2011/0121644 A1 | 5/2011 | Wellman |
| 2012/0168986 A1* | 7/2012 | Warnshuis ............... C04B 26/16 521/88 |
| 2012/0242143 A1* | 9/2012 | Feldmann ............ B62D 55/244 305/178 |

FOREIGN PATENT DOCUMENTS

| | | |
|---|---|---|
| WO | 9104145 A1 | 4/1991 |
| WO | 9221549 A1 | 12/1992 |
| WO | 2016138592 A1 | 9/2016 |

\* cited by examiner

| TRACK | TREAD 114 | CARCASS 110 | WP 216 | GL 106 |
|---|---|---|---|---|
| 1301 | PU | PU | PU | PU |
| 1302 | RUB | RUB | PU | PU |
| 1303 | RUB | PU | PU | RUB |
| 1304 | PU | RUB | RUB | RUB |
| 1305 | RUB | RUB | RUB | PU |
| 1306 | PU | RUB | RUB | PU |
| 1307 | RUB | RUB | RUB | RUB |

FIG. 13

URETHANE HYBRID AGRICULTURAL VEHICLE TRACK

RELATED APPLICATION INFORMATION

This patent application is a continuation-in-part application of U.S. patent application Ser. No. 15/340,011 filed Nov. 1, 2016 and a continuation-in-part application of U.S. patent application Ser. No. 16/159,018 filed Oct. 12, 2018, the disclosures of which are incorporated herein in its entirety, by reference thereto.

FIELD

The field to which the disclosure generally relates is vehicle tracks, and more particularly to vehicle tracks having guide-drive lugs, wheel path areas, carcass, ground treads, and other suitable combinations formed of urethane materials.

BACKGROUND

This section provides background information to facilitate a better understanding of the various aspects of the disclosure. It should be understood that the statements in this section of this document are to be read in this light, and not as admissions of prior art.

Positive guide-drive, endless rubber tracks such as those used on agricultural or industrial vehicles typically have an internal, center row of individual guide-drive lugs which engage guide-drive bars on a guide-drive wheel. The continued use and contact between the guide-drive bar and guide-drive lugs cause internal lug stresses and surface wear at the points of contact. Additionally, the internal, center row of lugs are typically functioning not only to transmit power from the guide-drive wheel to the track, but also to retain the track on the vehicle. Contact between the vehicle undercarriage wheels and lateral end of the guide surfaces of the inner lugs frequently occurs as the vehicle maneuvers during normal service. This contact can cause wearing of the inner lugs, which can be severe, depending upon various vehicle design features and application use. Driving and/or guiding forces on the inner lugs, henceforth referred to also as guide-drive lugs, can lead to cracks and eventual chunking of the rubber surface, and possibly to complete removal of the guide-drive lugs, making the track unserviceable. Thus, a track belt having guide-drive lugs which are stronger and more resistant to wear is desired.

United States Patent Publication No. 2008/0136255 A1 discloses an endless track belt for use in an industrial or agricultural vehicle. The endless rubber track belts described therein include a rubber carcass having an inner surface having one or more guide-drive lugs and an outer surface having tread lugs.

U.S. Pat. No. 6,974,196 B2 describes an endless track for an industrial or agricultural vehicle consisting of a body formed of a rubber material having an outer surface displaying a series of ground engaging profiles longitudinally spaced along the surface and an inner surface displaying a series of longitudinally spaced guide-drive lugs adapted to be engaged by guide-drive sprockets on the vehicle driving assembly. The body of the endless track is fabric reinforced. One layer of fabric longitudinally extends at a distance from the inner surface of the track and has a width slightly less than the width of the guide-drive lugs so that the fabric may extend inside the guide-drive lugs to increase their rigidity.

U.S. Pat. No. 8,567,876 B2 discloses a concept for a fabric reinforced rubber track guide-drive lug that provides a guide-drive lug which incorporates a fabric on or close to the surface of the lug to provide reinforcement. However, in some conditions, this surface reinforcement is often substantially abraded in service by contact with the wheels of the tracked vehicle and consequently does not last through the potential life of the track.

Thus, there is an ongoing need for endless tracks for industrial or agricultural vehicles with improved guide-drive lugs that extend the useable life of the track in conditions where guide-drive lug wear or damage are the primary life limiting conditions, such need met, at least in part, with embodiments according to the following disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, an endless vehicle track includes a body. The body has an outer surface and an inner surface. The outer surface includes a carcass and a series of ground engaging profiles longitudinally spaced along the outer surface. The inner surface includes a wheel path and a series of longitudinally spaced guide-drive lugs. One or more of the series of ground engaging profiles, the series of longitudinally spaced guide-drive lugs, the carcass and the wheel path comprise a urethane material.

In some embodiments of the disclosure, endless vehicle tracks include a body formed of an elastomeric material having an outer surface displaying a series of ground engaging profiles longitudinally spaced along the outer surface, and an inner surface formed a urethane reinforcement material. The inner surface generally displays a series of longitudinally spaced guide-drive lugs for retaining the track on the vehicle and/or driving the vehicle. In some aspects, the urethane reinforcement defines the inner surface of the body, and the urethane reinforcement may even be a continuous structure forming a base of the inner surface. In some cases, the urethane reinforcement defines wheel path regions of the body, and the urethane reinforcement may even form the guide-drive lugs. In some embodiments, the endless vehicle track further includes a fabric reinforcement layer disposed beneath or upon the outer surface of the upper face of the guide-drive lugs. The urethane reinforcement is formed from an admixture including a castable urethane material liquid which fills a mold and hardens to form the urethane reinforcement. The mold also includes a metal reinforcement therein and the castable urethane material is disposed adjacent the metal reinforcement. Also, an adhesive is disposed between the elastomeric material and the castable urethane material.

In some cases, the castable urethane material is a prepolymer containing methylene diphenyl diisocyanate (MDI), and in some aspects, the MDI is a methylene diphenyl diisocyanate terminated polycaprolactone prepolymer. In some other aspects, the castable urethane material is a prepolymer containing toluene diisocyanate (TDI), which may be a TDI terminated polycaprolactone prepolymer.

Some other embodiments of the disclosure are tracks including an outer surface formed of an elastomeric material displaying a series of ground engaging profiles, and a base disposed on the elastomeric material, where the base defines an inner surface and a series the guide-drive lugs. The base is generally formed of a urethane reinforcement material. The urethane reinforcement may be a continuous or non-continuous, sections, structure forming the inner surface, and may also form at least one wheel path region of the track. The urethane reinforcement may also form the guide-drive lugs. The urethane reinforcement is formed from an admixture including a castable urethane material liquid which fills a mold and hardens to form the urethane reinforcement. The mold also includes a metal reinforcement therein and the castable urethane material is disposed adjacent the metal reinforcement. Also, an adhesive is disposed between the elastomeric material and the castable urethane material.

Yet other embodiments of the disclosure are endless vehicle tracks having an outer portion formed of an elastomeric material and displaying a series of ground engaging profiles, as well as an inner portion formed of a urethane reinforcement material and displaying a series the guide-drive lugs. The urethane reinforcement is formed from an admixture including a castable urethane material liquid which fills a mold and hardens to form the urethane reinforcement. The mold also includes a metal reinforcement therein and the castable urethane material is disposed adjacent the metal reinforcement. Also, an adhesive is disposed between the elastomeric material and the castable urethane material. The castable urethane material may be selected from one of a prepolymer comprising methylene diphenyl diisocyanate (MDI), a prepolymer comprising toluene diisocyanate (TDI), and mixtures thereof. Either of the MDI and TDI may be an isocyanate terminated polycaprolactone prepolymer.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 13 is a table illustrating suitable configurations for a track in accordance with one or more embodiments.

DETAILED DESCRIPTION

Figure 1:
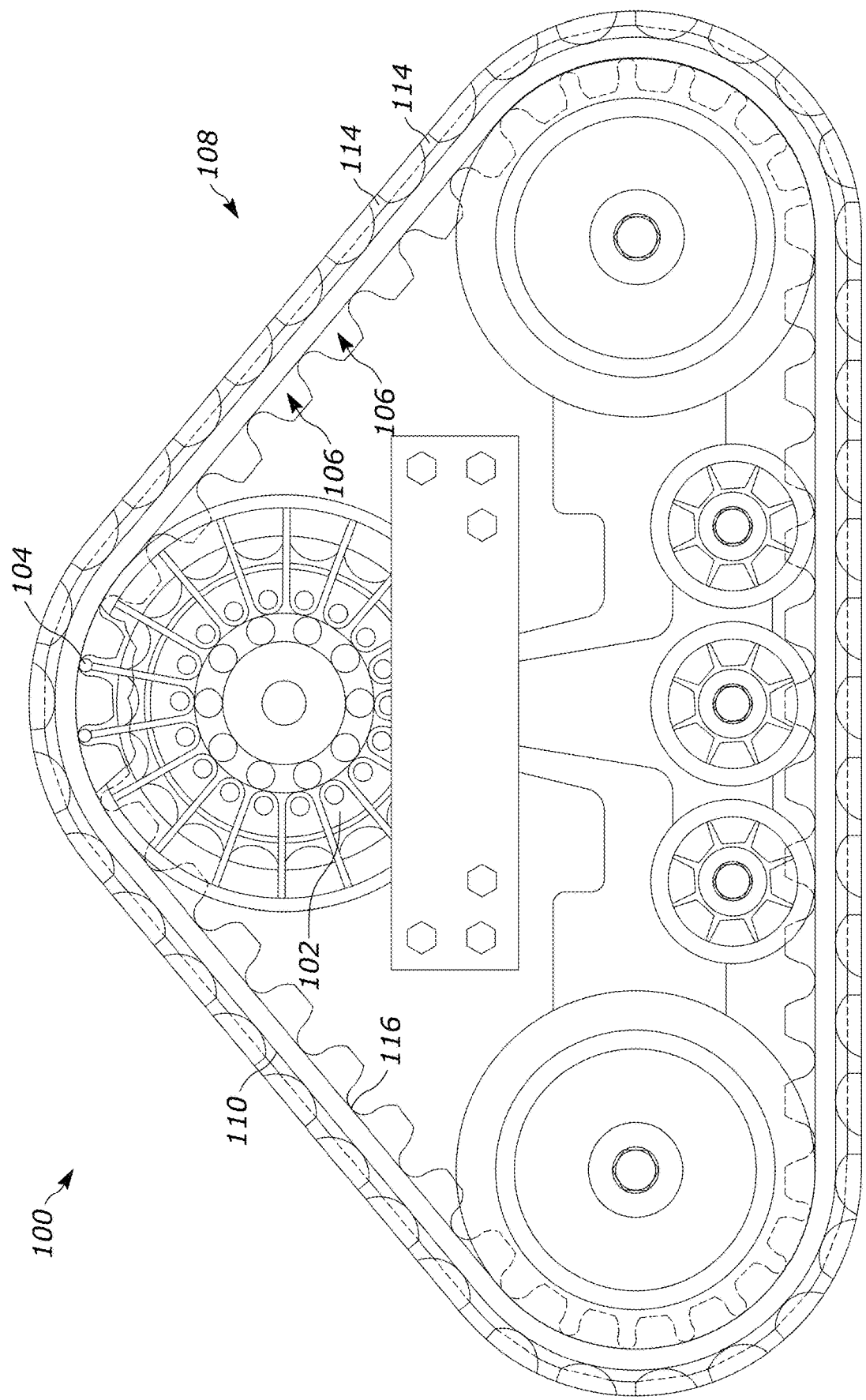
FIG. 1 illustrates a track assembly which may be used on an industrial or agricultural vehicle, according to an embodiment of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a range or dimension listed or described as being useful, suitable, or the like, is intended that any and every value or dimension within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosure, are tracks which generally include a body having an outer surface displaying a series of ground engaging profiles longitudinally spaced along the outer surface and formed of an elastomeric material, and an inner surface formed of a urethane reinforcement material, such as a castable urethane material, where the inner surface includes a series of longitudinally spaced guide-drive lugs for retaining the track on the vehicle and/or driving the vehicle. The track embodiments according to the disclosure provide improved transfer of torque and power through incorporation of urethane material in various areas of the track construction, and may be combined with other polymers and metal combinations to provide traction and rubber isolation. Further, longer track life may be realized as well.

As used in the summary and this detailed description, the phrase "elastomeric material" means a material comprising at least one elastomer that can be reinforced with at least one filler such as carbon black, which may be a natural rubber or synthetic rubber, such as emulsion styrene-butadiene rubber, solution styrene-butadiene rubber, synthetic polyisoprene rubber, polybutadiene rubber, or a blend of natural and synthetic rubbers. Such elastomeric materials may also be mixed with other materials, such silica, clay, organic fiber, inorganic metal powder, mineral powder, talc, calcium sulfate, calcium silicate, distillates, curatives, accelerators, activators, processing aids, antioxidant packages, pigments, and the like.

The phrase "castable urethane material" means polyurethane forming material(s) used in a method of casting where a mold is filled with a liquid synthetic polymer, which then hardens. In some embodiments according to the disclosure, casting may be accomplished with the liquid polymer plus an effective amount of a "hardener" liquid, which functionally contains a second polymer or reactant, for use in forming a final product which is a copolymer. Copolymers contain two different alternating chemical entities in the final polymer molecule. For example, in a polyurethane casting process, the polyurethane polymer structure may be formed by reacting a di- or polyisocyanate with a polyol or polyamine. Nonlimiting examples of such materials include DURACAST® C930 MDI-terminated polycaprolactone prepolymer reacted with DURACURE™ C3-LF (4,4'-diaminodiphenylmethane), both available from LANXESS Corporation, Philadelphia, Pa.

The isocyanates and polyols or polyamines used to make polyurethanes may in some aspects contain on average two or more functional groups per molecule. The materials are mixed, introduced into the mold, and exposed to certain conditions (i.e. temperature, time, pressure, etc.) to form the polyurethane polymer structure or body. In some aspects, the casted urethane materials are prepared by a low pressure casting process where pressure within an empty mold is sufficiently reduced, and low pressure is used to transfer the reaction components into the empty mold, which then react and cast the structure. In some other aspects, the structure are formed using a compression mold process which does not involve lowering pressure in the mold, but rather, high pressure is used to transfer the reaction components into the empty mold, and sufficient forces are placed on the components in the formation of the structure in the mold. In yet other embodiments, the cast urethane materials are prepared by pouring the reactants into a mold, and allowing the structure to form under suitable conditions.

In some cases, the polyurethane structure is first cast by combining and reacting the polyisocyanate and polyol or polyamine components, and then the structure combined with the elastomeric material and other reinforcement components to form a track. Sufficient heat and/or pressure Adhesive may be provided to vulcanize or otherwise cure the track. Such heat and/or pressure may also be suitable to promote sufficient bonding of the casted urethane structure, elastomeric material and reinforcement components.

The castable urethane material(s) may also be mixed with various additives in conventional or suitable amounts known to persons having ordinary skill in the art. Such additives may include, and are not limited to, cross-linking agents, accelerators, retardants to prevent an unduly quick cure, antioxidants, aging resistance aids (e.g., ozone and UV resistance), adhesion promoters, processing aids, flame retardancy additives, reinforcing agents and fillers, such as carbon black, silica, other mineral fillers, lignin, fibers, friction modifiers such as ultra-high molecular weight polyethylene (UHMWPE), polytetrafluoroethylene (PTFE), and the like. In some cases, carbon black, silver salts, or any other suitable electrically conductive materials may also be added to control and/or reduce static electricity buildup. Reinforcing fillers are typically utilized at a level which is within the range of about 50 parts per hundred parts of resin (phr) to about 150 phr.

Now referencing FIG. 1, which illustrates a track assembly 100 which may be used on an industrial or agricultural vehicle (not shown). The track assembly 100 includes a guide-drive wheel 102 having a plurality of teeth or guide-drive bars 104 that are positioned for mating engagement with guide-drive lugs 106. The guide-drive lugs 106 are mounted on a rubber track 108 having an endless elongate carcass defining a longitudinal direction around the circumference thereof. The endless track carcass has an outer surface 110 including a plurality of ground engaging tread lugs 114 and an inner surface 116 with a plurality of guide-drive lugs 106, typically located on or near the center portion of the carcass.

Figure 2:
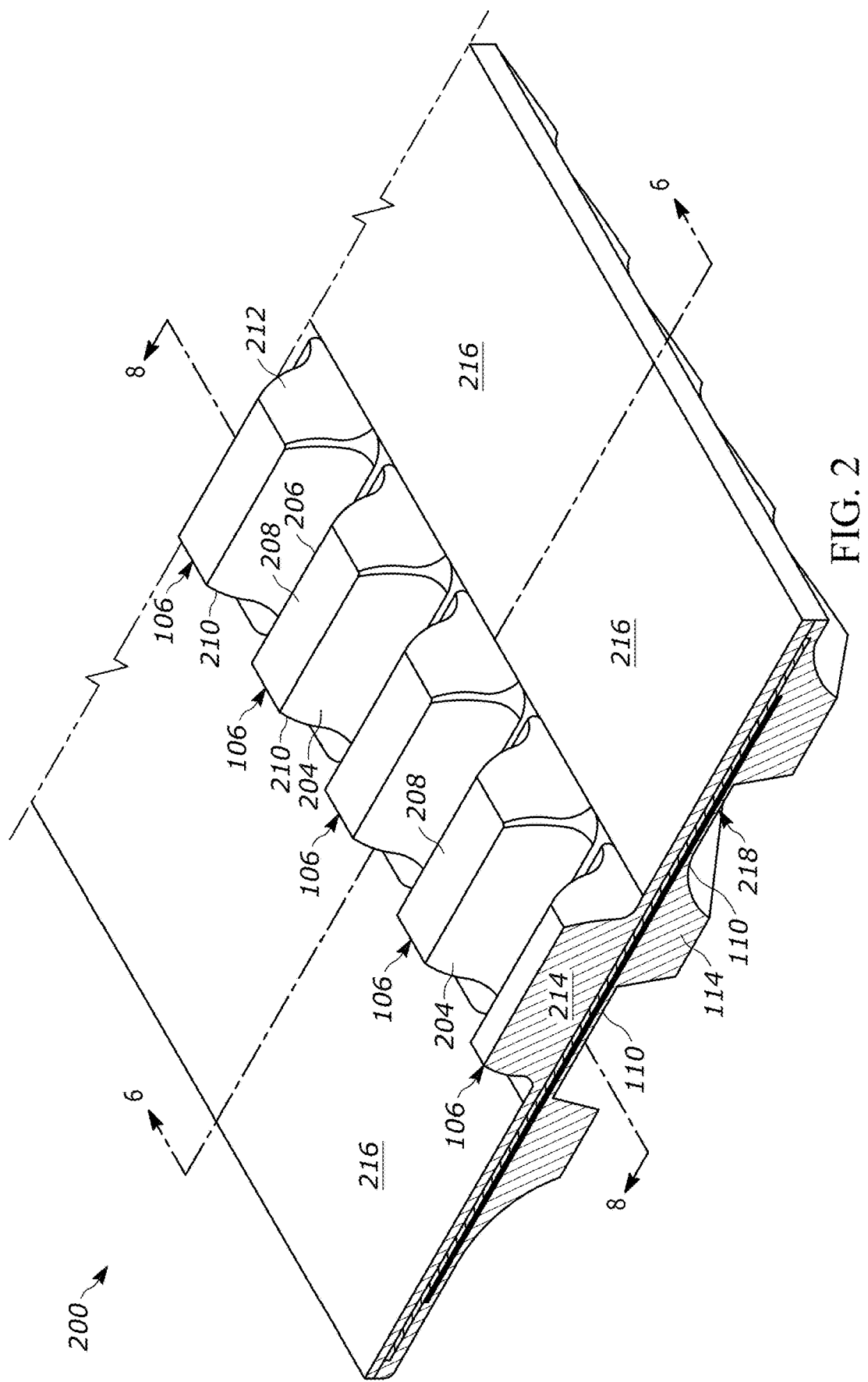
FIG. 2 depicts, in a perspective view, a portion of a track where guide-drive lugs both retain the track on the vehicle and are engaged and driven by a guide-drive wheel in accordance with an embodiment of the disclosure; and, FIGS. 3 and 4 are fragmented cross-sectional views of the portion of a track depicted in FIG. 2, in accordance with aspects of the disclosure.

FIG. 2 illustrates one embodiment according to the disclosure where guide-drive lugs both retain the track on the vehicle and are engaged by the guide-drive wheel to transfer power to the track. In another embodiment of the disclosure, the guide-drive lugs are only provided for the purpose of retaining the track on the vehicle. In this scenario, the guide-drive lug only act in the capacity of guide-lugs. In cases where the lugs act to both guide and guide-drive the track, each guide-drive lug 106 comprises an elongated shaped bar with inclined guide-drive faces 204, 206, and an upper flat face 208. The inclined faces are typically known as the guide-drive face 204 and the reverse face 206 of the guide-drive lugs 106. End or guiding faces 210, 212 may be flat or in the alternative they can have various other suitable shapes, such as tapered, convex, concave, and the like. Wheel path areas 216 are generally disposed adjacent the guide-drive lugs 106. In embodiments according to the disclosure, guide-drive lugs 106 and wheel path areas 216 adjacent thereto are components of the inner surface of the track, and formed of urethane reinforcement material. Outer surface 110 displaying engaging tread lugs 114 are generally formed of the elastomeric material.

Embedded within the elastomeric material forming outer surface 110 are one or more reinforcement layers 218 which extend transversely along the track width. The reinforcement layers 218 may include such components as longitudinal cable reinforcement layers, fabric reinforcement layers, transverse cable reinforcement layers (disposed at right angles to the longitudinal direction) or any other reinforcement layer known to those skilled in the art.

Figure 3:
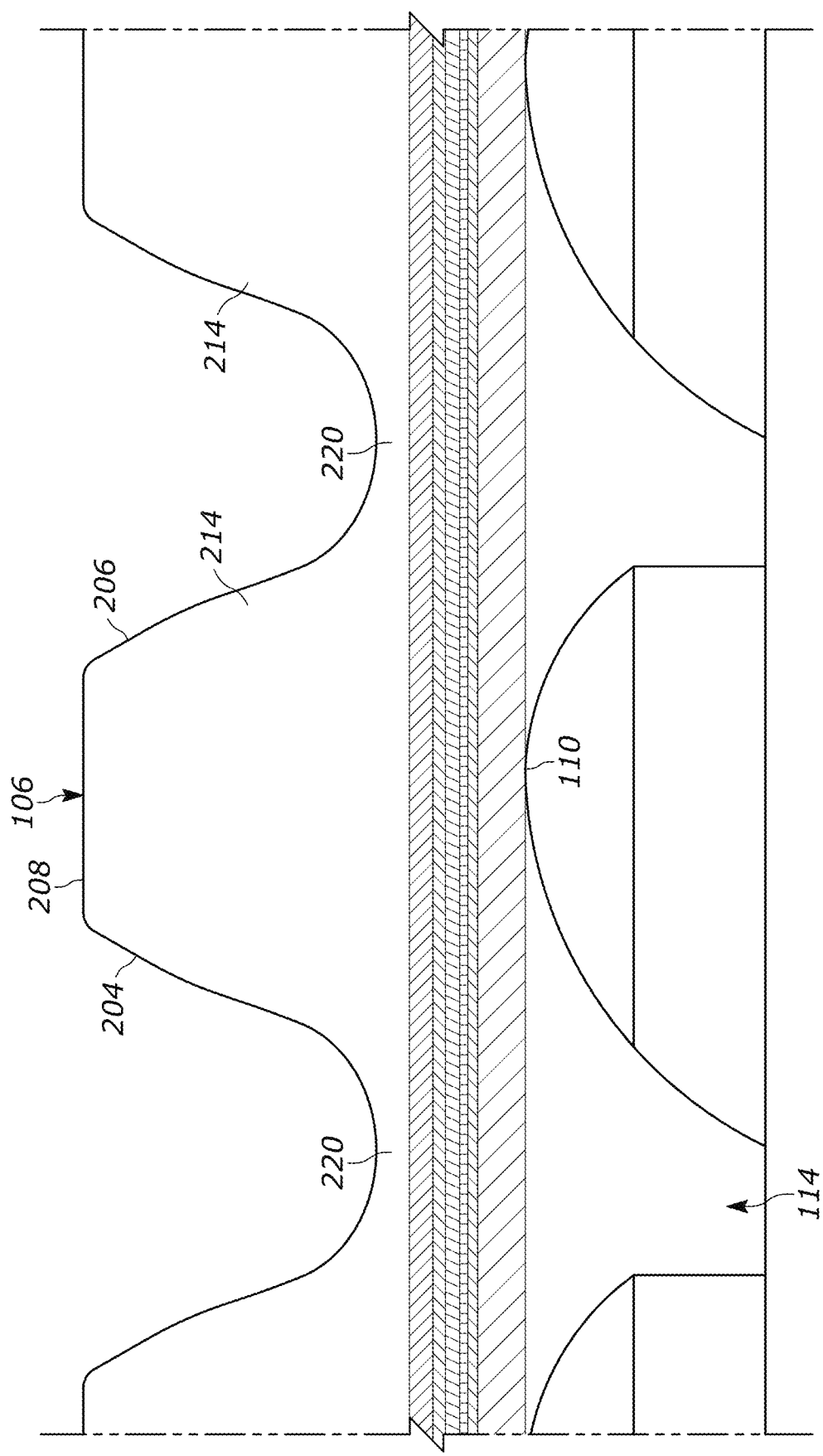

Now referring to FIG. 3 which shows a cross view taken at reference plane 8 in FIG. 2, guide-drive lugs 106 defining guide-drive faces 204, 206, and upper flat face 208, as well as guide-drive body 214 are formed from urethane reinforcement material. In some embodiments, reinforcement layer(s) may be disposed within guide-drive body 214, adjacent the surface of guide-drive lugs 106. Urethane reinforcement material also forms base 220 of the urethane reinforcement structure. In some aspects, the urethane reinforcement includes a metal reinforcement therein or thereupon, and in some cases, the mold in which a castable urethane material is placed, contains the metal reinforcement therein and the castable urethane material is disposed adjacent (i.e. either in contact with one side or fully surrounding) the metal reinforcement before hardening. Base 220 also defines wheel path areas of the track, as described in further detail in FIG. 4.

The metal reinforcement of the urethane reinforcement may be within individual lugs 106, extend from one lug 106 to another lug 106, be positioned below lugs 106, or even be positioned below lugs 106 while extending from one lug 106 to a next lug 106 and so on. In some aspects, the guide-drive lugs 106 include the metal reinforcement partially or substantially covering all or a portion of the end faces of the guide-drive lugs 106. The metal reinforcements may be of one or more layers, and may be include continuous strips, or discrete strips, of metal reinforcement. In some aspects, the reinforcement matches the shape of the guide-drive 106 end faces of the guide-drive lugs 106 and wheel path area.

Any suitable metal reinforcement may be used in embodiments of the disclosure, including, but not limited to fabric cut outs, metal cable, mesh/matrix, and the like, or combination thereof. In some aspects, the metal reinforcement is a non-polymer material added to the urethane reinforcement structure providing rigidity and strength. Some non-limiting examples include 1 mm diameter steel or brass cables at spacing EPI ranges from 12 to 1 EPI. The reinforcement may be imbedded in the warp, weft, or combination directions and angles. The S & Z, or cable twist, may also be combinations thereof.

Figure 4:
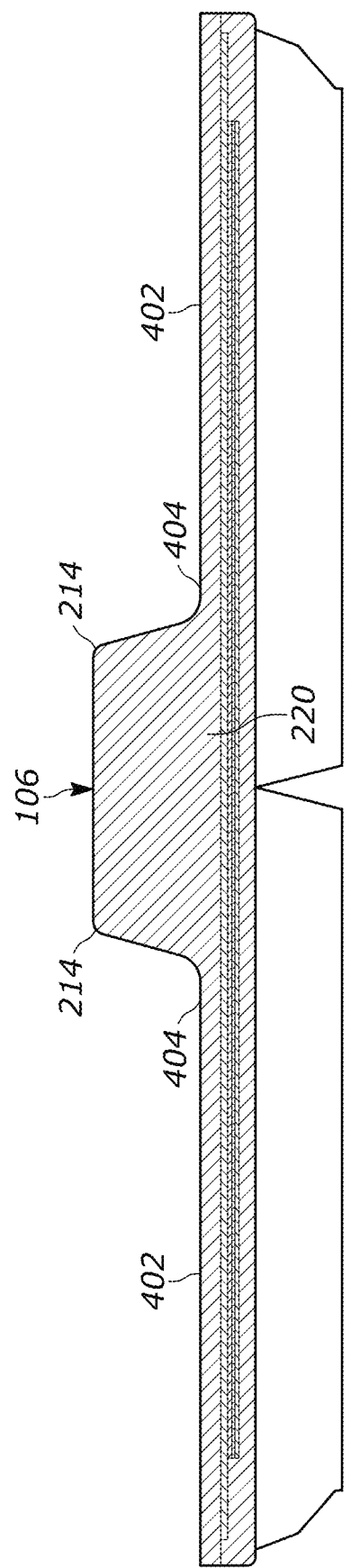

With reference to FIG. 4, which depicts a cross-sectional view taken at reference plane 6 of the track shown in FIG. 2, guide-drive lug 106 and the respective body 214, as well as base 220 are formed of urethane reinforcement material, such as castable urethane material. The inner surface of the track is defined by guide-drive lug 106 and region 402 of the track, which is a continuous urethane reinforcement material surface. Further, base 220 also defines wheel path areas 404 of inner surface 402 of the track.

Elements of the belts according to the disclosure, may in some cases, include an adhesive therebetween to promote bonding between the elements. For example, the elastomeric material may have an adhesive coating where it is in contact with the urethane reinforcement. Similarly, the metal reinforcement may have an adhesive precoating where it is in contact with the urethane reinforcement. Any suitable adhesive(s) may be used which promotes and improves adhesion between the various elements. Some non-limiting examples of such adhesives may be selected from the line of products sold under the tradename CILBOND®, available from Kommerling UK Limited, Lancashire, UK. In some aspects, the adhesive material can be used as a splicing cement to bond cured to uncured, uncured to uncured and cured to cured rubbers, polyurethanes, and reinforcements to each other, or even themselves. Application can include but not be limited to brushing, spraying or dipping in agitated, diluted or non-diluted solutions. Any suitable adhesive coating thickness may be used, for example from about 15 to about 30 microns, but not limited too. The adhesive may provide excellent tear bonds when molded by either conventional or post-vulcanization bonding techniques, as well as also providing good environmental resistance. Bonds are resistant to temperatures between from about −40° C. to about +180° C. The adhesive(s) may also be useful for low temperature post-vulcanization bonding.

Figure 5:
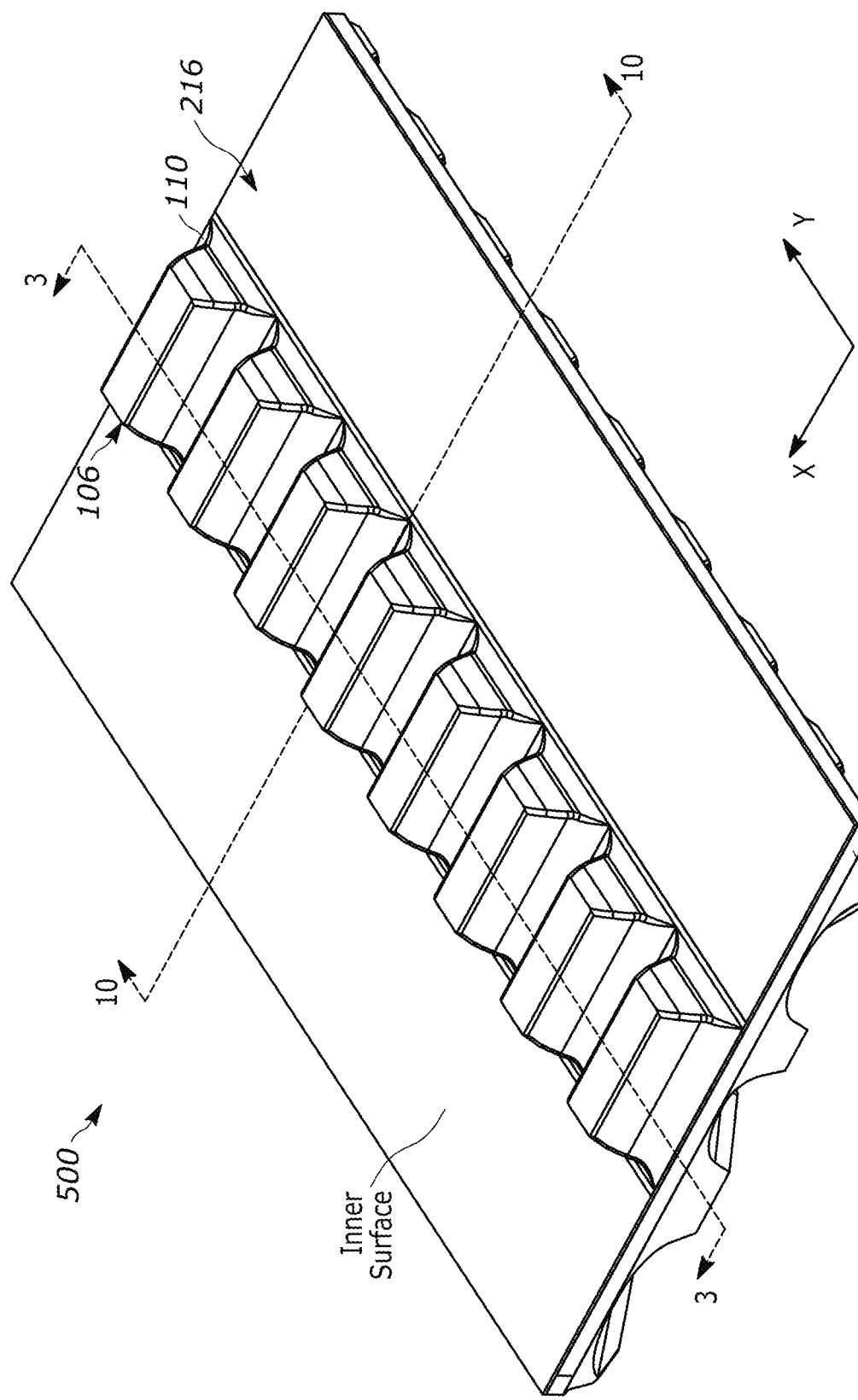
FIG. 5 illustrates a track in accordance with one or more embodiments.

FIG. 5 illustrates a track 500 in accordance with one or more embodiments. The track 500 includes guide-drive lugs to retain the track on the vehicle and are engaged by the guide-drive wheel to transfer power to the track. In another embodiment of the disclosure, the guide-drive lugs are only provided for the purpose of retaining the track on the vehicle. In this scenario or example, the guide-drive lug only acts in the capacity of guide-lugs. It is appreciated that suitable variations of the track 500 are contemplated.

The track 500 is similar to the track 200, described above with regard to FIG. 2. The description of FIG. 2 can be referenced for additional understanding of the track 500. The track 500 can be used with the track assembly 100, described above.

The track 500 includes guide-drive lugs 106 having an elongated shaped bar with inclined guide-drive faces 204, 206, and an upper flat face 208. The inclined faces are typically known as the guide-drive face 204 and the reverse face 206 of the guide-drive lugs 106. End or guiding faces 210, 212 may be flat or in the alternative they can have various other suitable shapes, such as tapered, convex, concave, and the like. Wheel path areas 216 are generally disposed adjacent the guide-drive lugs 106.

The guide-drive lugs 106 and wheel path areas 216 adjacent thereto are components of an inner surface of the track 500. The lugs 106 and/or the wheel path areas 216 can be formed of urethane reinforcement material and/or an elastomeric material. In one example, the wheel path areas are formed of the urethane reinforcement material and the lugs 106 are formed of elastomeric material. In another example, the wheel path areas are formed of the elastomeric material and the lugs are formed of the urethane reinforcement material.

Additionally, an outer surface 110 displaying engaging tread lugs 114 can be formed of the elastomeric material and/or the urethane reinforcement material.

Embedded within the outer surface 110 are one or more reinforcement layers 218 which extend transversely along the track width. The reinforcement layers 218 may include such components as longitudinal cable reinforcement layers, fabric reinforcement layers, transverse cable reinforcement layers (disposed at right angles to the longitudinal direction) or any other reinforcement layer known to those skilled in the art.

Figure 6:
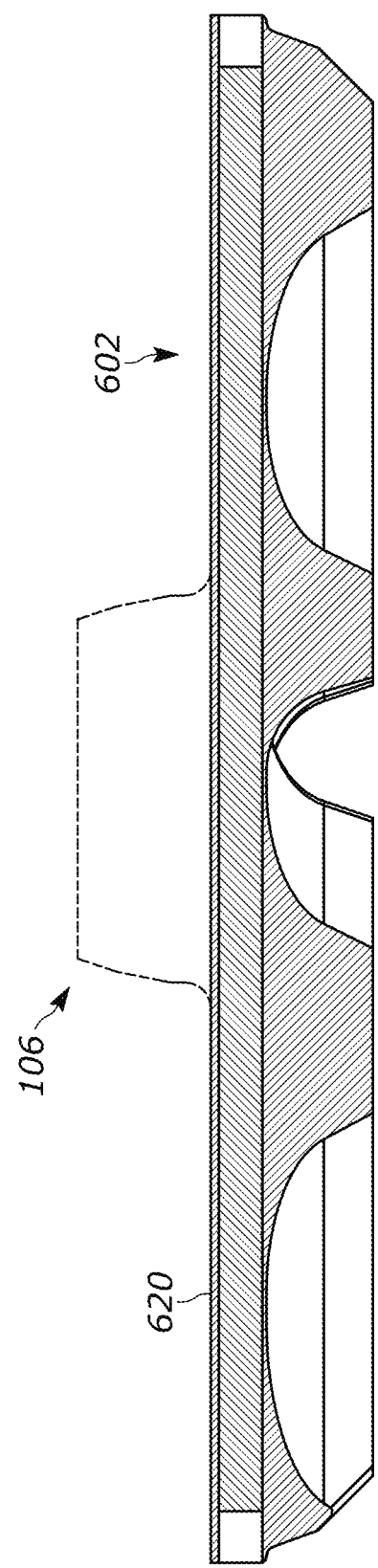
FIG. 6 is a cross view taken at reference plane 10 in FIG. 5 illustrating one or more embodiments.

FIG. 6 is a cross view taken at reference plane 10 in FIG. 5 illustrating one or more embodiments.

Here, a base 620 is shown and is similar to the base 220 described above. The base 620 can also be comprised of the urethane reinforcement material and/or the elastomeric material.

It is appreciated that in some aspects or embodiments, the urethane reinforcement of the base 620 includes a metal reinforcement therein or thereupon, and in some cases, the mold in which a castable urethane material is placed, contains the metal reinforcement therein and the castable urethane material is disposed adjacent (i.e. either in contact with one side or fully surrounding) the metal reinforcement before hardening. The base 620 also defines wheel path areas 602 of the track.

Figure 7:
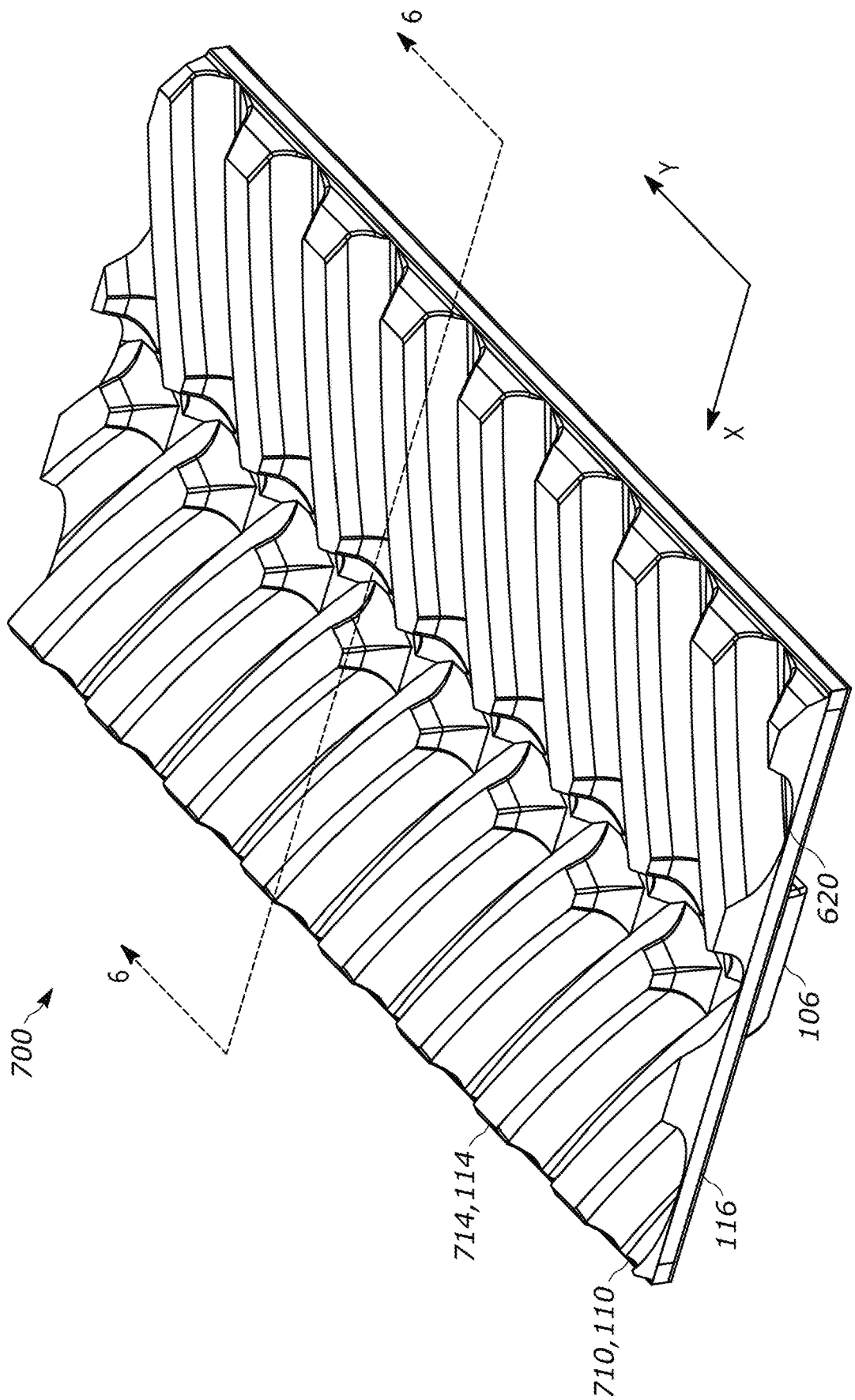
FIG. 7 is a perspective outside view of a track in accordance with one or more embodiments.

FIG. 7 is a perspective outside view of a track 700 in accordance with one or more embodiments. The track 700 is provided for illustrative purposes and it is appreciated that suitable variations are contemplated. Some portions and/or elements of the track 700 may be omitted to facilitate understanding. The track 700 can be used as the track in the track assembly 100 shown above.

The track 700 is similar to the tracks 200 and 500, described above. The descriptions of FIG. 2 and FIG. 5 can also be referenced for additional understanding/explanation of the track 700.

The track 700 includes an inner surface 116, guide-drive lugs 106 and a base on an inner surface of the track 700.

The track 700 also includes an outer surface 710 that includes ground treads or lugs 714. The outer surface 710 is similar to the outer surface 110 described above and can be at least a portion of a carcass and/or an outer portion of a carcass. The ground lugs 714 are similar to the ground lugs 114 described above.

The ground lugs 714 and/or the outer surface 710 can be at least partially comprised of urethane reinforcement material and/or elastomeric material. In one example, the ground lugs 714 and the outer surface 710 comprise the urethane reinforcement material. In another example, the ground lugs 714 comprise the urethane reinforcement material and the outer surface 710 comprises elastomeric material. In yet another example, the ground lugs 714 are comprised of the urethane reinforcement material and the elastomeric material.

Figure 8:
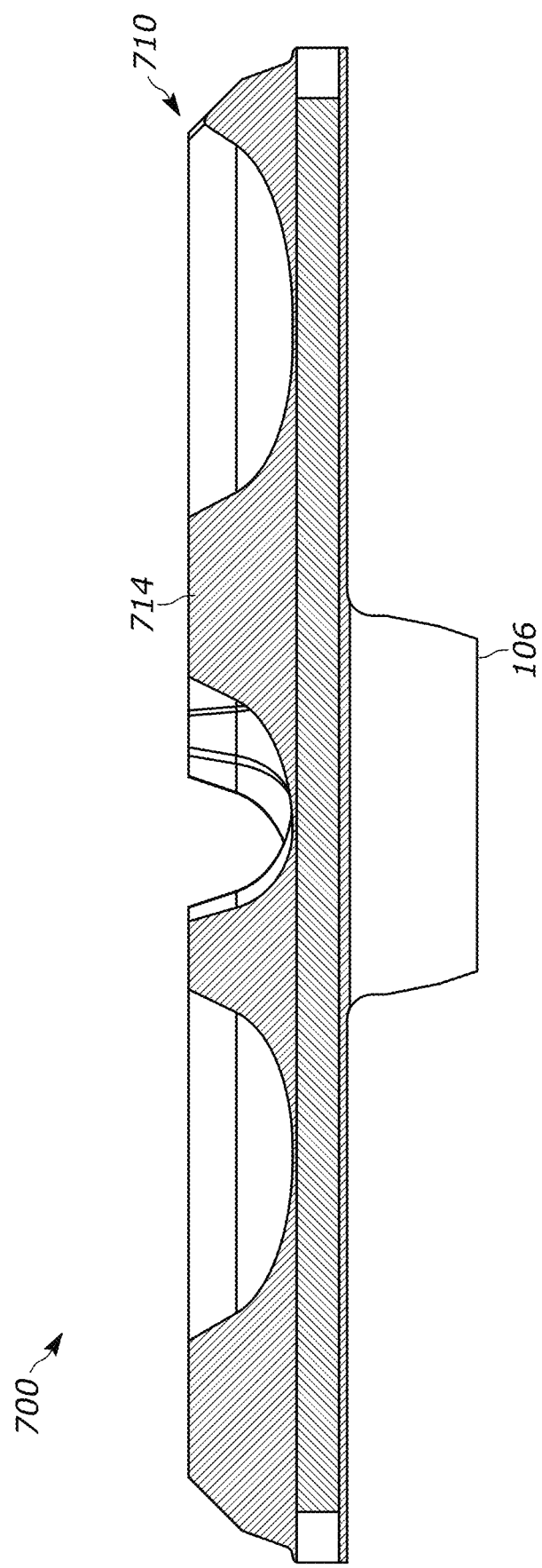
FIG. 8 is a cross section view of the track in accordance with one or more embodiments.

FIG. 8 is a cross section view of the track 700 in accordance with one or more embodiments.

Here, the track 700 is shown with guide lugs 106, guide treads 714 and the outer surface 710.

Figure 9:
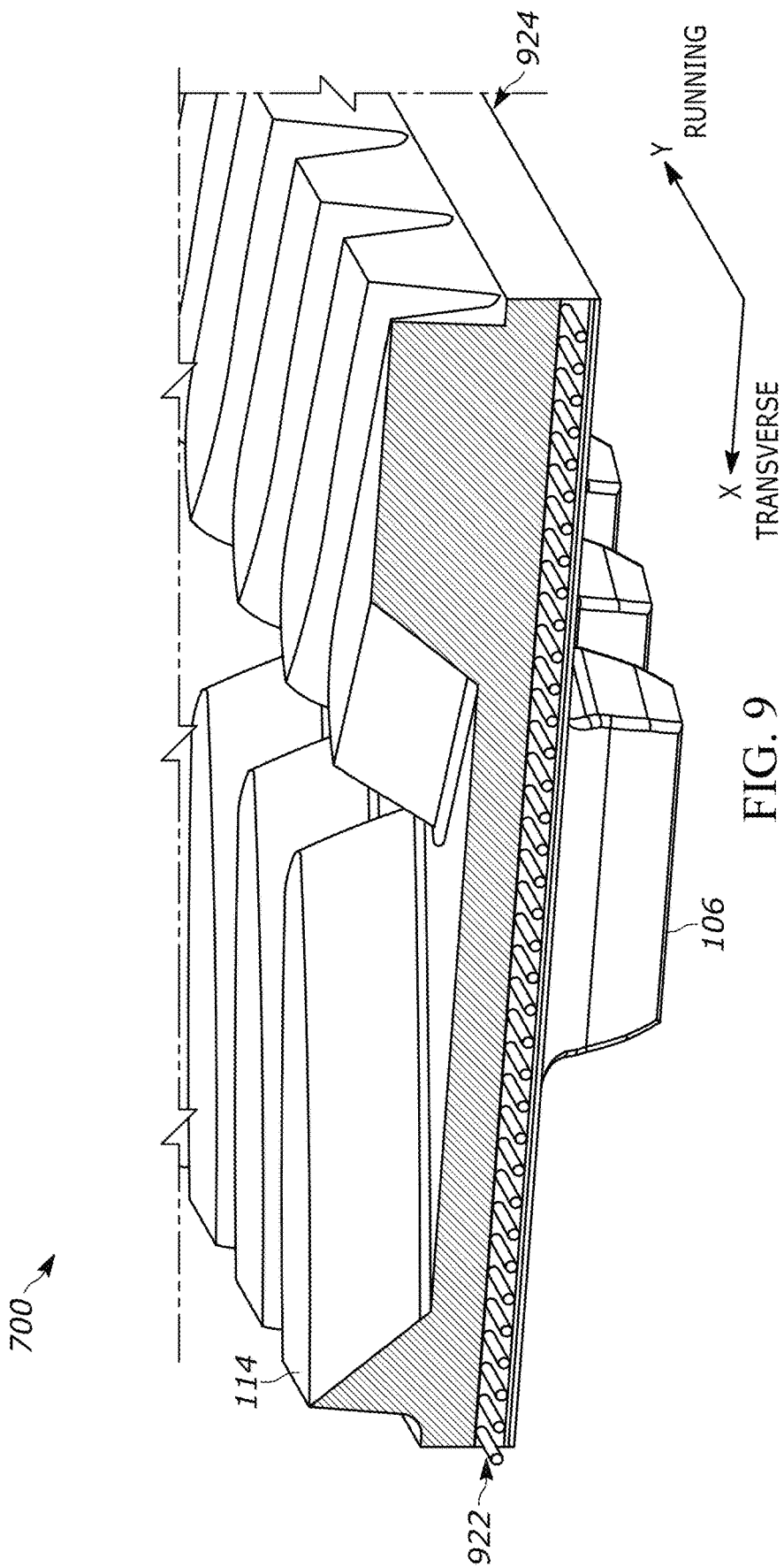
FIG. 9 is another cross section view of the track in accordance with one or more embodiments.

FIG. 9 is another cross section view of the track 700 or the track 500 in accordance with one or more embodiments.

A reinforcement material or mesh 922 is shown formed within an inner layer 924 of the track 700. The inner layer 924 can be at least partially comprised of urethane reinforcement material and/or elastomeric material.

Figure 10:
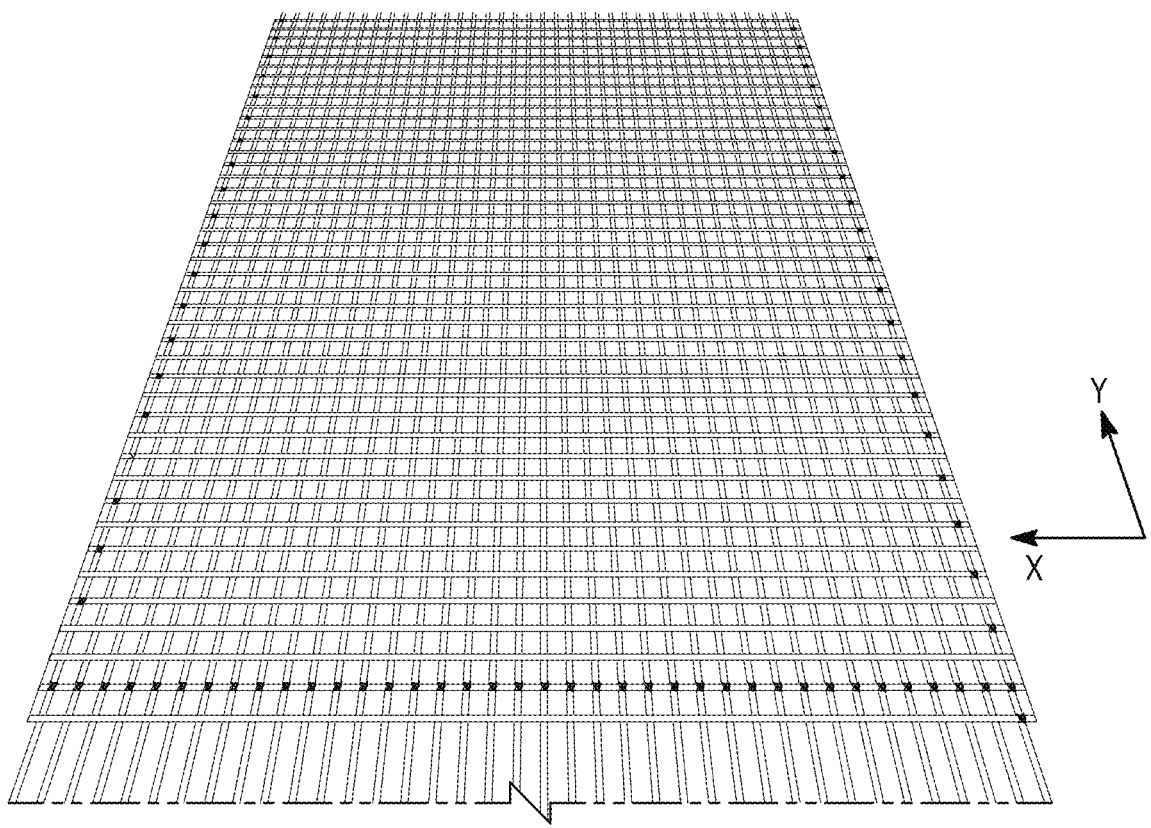
FIG. 10 is a view of the mesh in accordance with one or more embodiments.

FIG. 10 is a view of the mesh 922 of the track 500 or the track 700 in accordance with one or more embodiments.

In this example, there are lines or rods of the mesh in an x direction and lines or rods in a y direction.

In one example, the rods in the x direction are smaller or thinner than the rods in the y direction.

Figure 11:
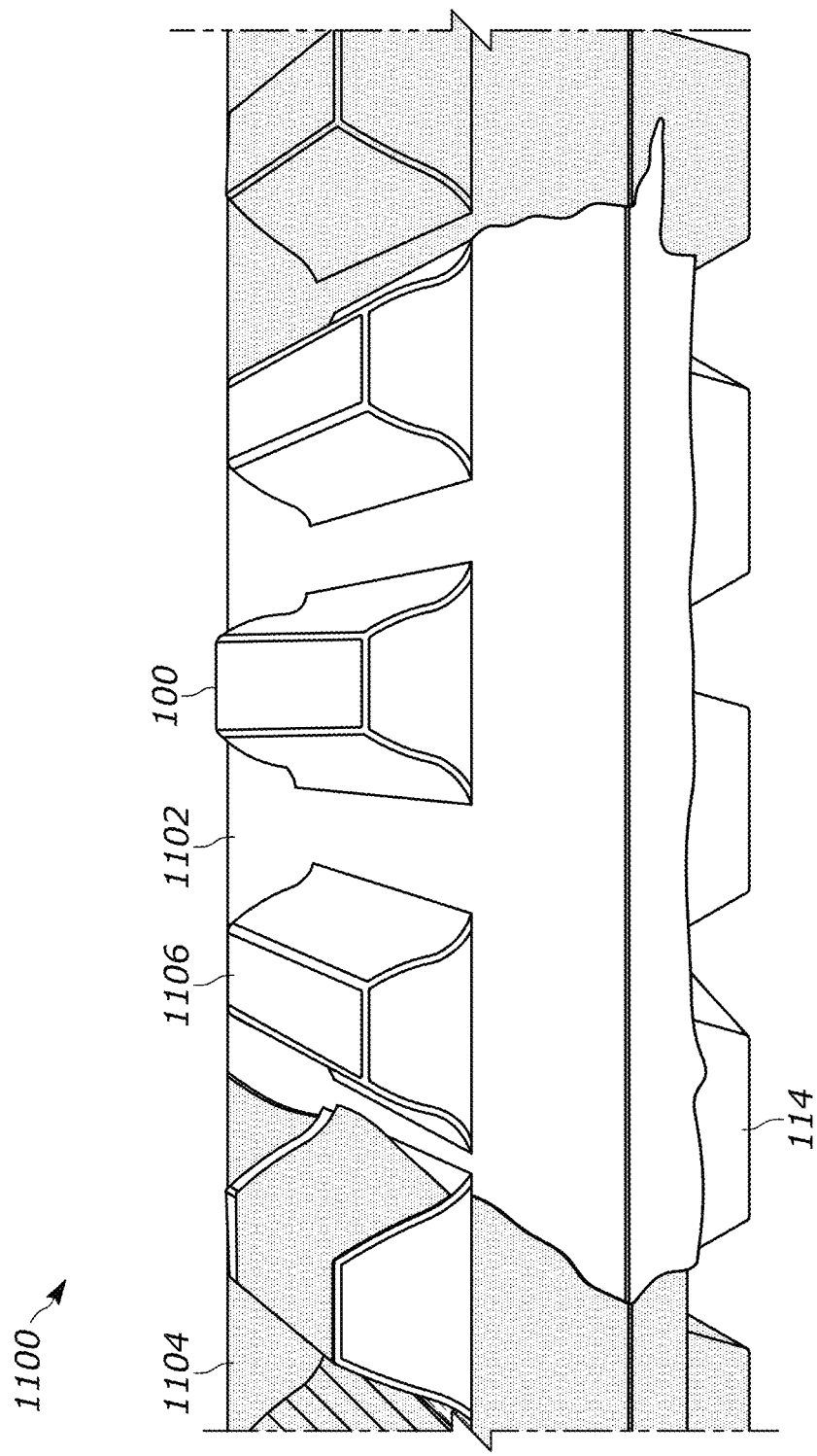
FIG. 11 is a perspective view of at least a portion of a track in accordance with one or more embodiments.

FIG. 11 is a perspective view of at least a portion of a track 1100 in accordance with one or more embodiments. The track 1100 is provided for illustrative purposes and it is appreciated that suitable variations are contemplated. Some portions and/or elements of the track 1100 may be omitted to facilitate understanding. The track 1100 can be used as the track in the track assembly 100 shown above.

The track 1100 is similar to the tracks 200, 500 and 700, described above. The description of FIG. 2 can also be referenced for additional understanding of the track 1100.

The track 1100 similarly includes guide lugs 106, ground lugs 114 and the like as described above.

The track 1100 includes segments of track having varied material composition. The track 1100 is shown with a urethane segment 1102 and an elastomeric segment 1104. The segments can be connected to adjacent segments by a segment interface, such as the segment interface 1106.

The urethane segment 1102 is substantially comprised of urethane reinforcement material in this example. However, it is appreciated that portions and/or layers of the urethane segment 1102 can be comprised of elastomeric material. For example, the guide lugs can be formed of the elastomeric material and the ground lugs formed of the urethane reinforcement material. In another example, the guide lugs are formed of the urethane reinforcement material and the ground lugs are formed of the elastomeric material.

The elastomeric segment 1104 is substantially comprised of elastomeric material in this example. However, it is appreciated that portions and/or layers of the urethane segment 1102 can be comprised of elastomeric material. For example, the guide lugs can be formed of the elastomeric material and the ground lugs formed of the urethane reinforcement material. In another example, the guide lugs are formed of the urethane reinforcement material and the ground lugs are formed of the elastomeric material.

The segment interface 1106 attaches the segments 1102 and 1104 together. The segment interface 1106 is comprised of both the elastomeric material and the urethane reinforcement material.

In one example, the segment interface 1106 is molded subsequent to forming the segments.

In another example, the segment interface 1106 comprises an adhesive material configured to join adjacent segments, such as 1102 and 1104.

Figure 12:
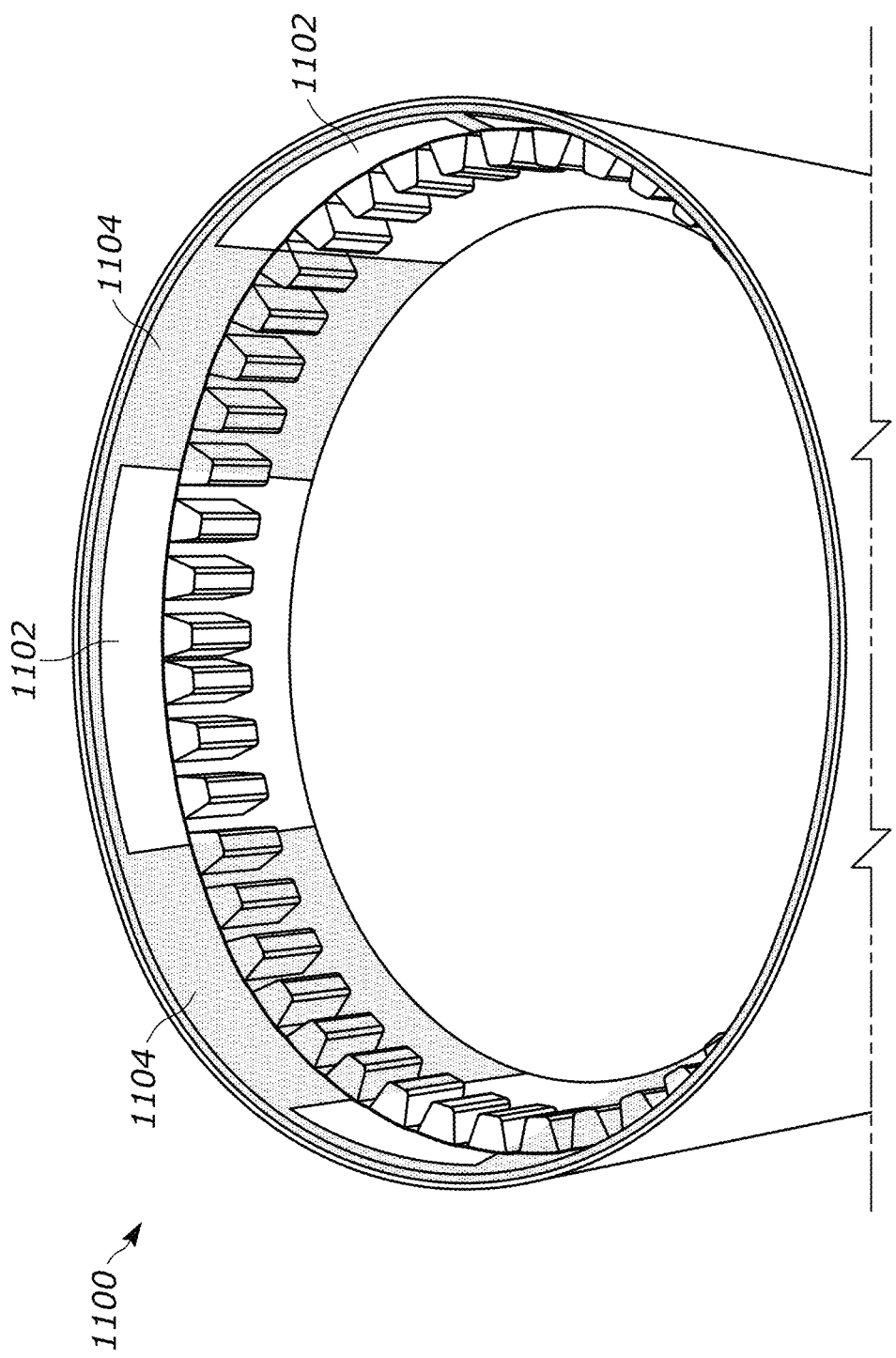
FIG. 12 is a diagram also illustrating the track in accordance with one or more embodiments.

FIG. 12 is a diagram also illustrating the track 1100 in accordance with one or more embodiments.

Here, the track 1100 is shown with alternating segments of 1102 and 1104. The track 1100 is shown having 8 segments.

It is appreciated that the number of segments in a track, the lengths of the segments and the like can vary.

FIG. 13 is a table 1300 illustrating example suitable configurations for a track in accordance with one or more embodiments. The tracks can be used with the assembly 100 and/or variations thereof. The configurations can be applied to and/or used with the tracks 200, 500, 700, 1100 and variations thereof.

The table 1300 depicts a portion of the elements or components of the tracks along as shown. The components include tread lugs 114, carcass/layer 110, wheel path 216 and guide lugs 106. It is appreciated that other track layers/components can be included. The tracks are comprised of a urethane material and/or an elastomeric material.

The carcass 110 includes and/or is an outer layer of the track and is adjacent to and/or in physical contact with the tread lugs 114. The tread lugs 114 can be positioned on an outer surface of the carcass 110, in one example. The tread lugs 114 have properties including height, width, angle, side profiles and the like. The wheel path 216 and the guide lugs 106 are located on inner surfaces of the tracks.

The urethane material or urethan reinforcement material is formed from an admixture including a castable urethane material liquid which fills a mold and hardens to form the urethane reinforcement. The castable urethane material(s) may also be mixed with various additives in conventional or suitable amounts known to persons having ordinary skill in the art. Such additives may include, and are not limited to, cross-linking agents, accelerators, retardants to prevent an unduly quick cure, antioxidants, aging resistance aids (e.g., ozone and UV resistance), adhesion promoters, processing aids, flame retardancy additives, reinforcing agents and fillers, such as carbon black, silica, other mineral fillers, lignin, fibers, friction modifiers such as ultra-high molecular weight polyethylene (UHMWPE), polytetrafluoroethylene (PTFE), and the like. In some cases, carbon black, silver salts, or any other suitable electrically conductive materials may also be added to control and/or reduce static electricity buildup. Reinforcing fillers are typically utilized at a level which is within the range of about 50 parts per hundred parts of resin (phr) to about 150 phr.

The mold and/or molding process can also include a metal reinforcement therein and the castable urethane material is disposed adjacent the metal reinforcement. Also, an adhesive can be disposed and/or located between the elastomeric material and the urethane material. The mold can include a plurality of molds and/or portions for various elements of the tracks, such as the tread lugs 114, carcass/layer 110, wheel path 216 and guide lugs 106 and the like. Individual elements can be connected using the adhesive and/or other suitable techniques.

It is appreciated that use of the urethane material for elements in a track can facilitate durability, mitigate generation of heat by friction, and the like. It is also appreciated that use of elastomeric material for elements in a track can facilitate traction and the like. It is also appreciated that each of the elements can be comprised of the urethane material, the elastomeric material and/or combinations of the urethane and elastomeric materials. It is also appreciated that suitable compositions of the elements are contemplated even though only a subset are shown and described below. Tracks that have some elements comprised of elastomeric material and other elements comprised of urethane material can be referred to as hybrid tracks.

Track 1301 is depicted as 114, 110, 216 and 106 as having or being comprised of the urethane reinforcement material.

Track 1302 is depicted as 216 and 106 as having or being comprised of the urethane reinforcement material and 114 and 110 has having or being comprised of the elastomeric material.

Track 1303 is depicted as 110 and 216 as having or being comprised of the urethane reinforcement material and 114 and 106 has having or being comprised of the elastomeric material. The track 1303 can provide enhanced traction for ground use by using the elastomeric material for the tread 114 while mitigating heat generation by using the urethane material for the carcass 110 and guide lugs 106.

Track 1304 is depicted as 114 as having or being comprised of the urethane reinforcement material and 110, 216 and 106 has having or being comprised of the elastomeric material.

Track 1305 is depicted as 106 as having or being comprised of the urethane reinforcement material and 114, 110 and 216 has having or being comprised of the elastomeric material. Thus, the guide lugs 106 are comprised of the urethane material and can be more durable and generate less heat than similar guide lugs comprised of elastomeric material.

Track 1306 is depicted as 114 and 106 as having or being comprised of the urethane reinforcement material and 110 and 216 has having or being comprised of the elastomeric material.

Track 1307 is depicted as 114, 110, 216 and 106 has having or being comprised of the elastomeric material.

It is appreciated that other suitable combinations of materials and/or components are contemplated.

The tracks and combinations thereof can be used with agriculture tracked vehicles and the like.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An endless vehicle track comprising a body comprising:
    a plurality of track segments, each having an outer surface comprising a carcass and a series of ground engaging profiles longitudinally spaced along the outer surface; and
    an inner surface comprising a wheel path and a series of longitudinally spaced guide-drive lugs and a segmented interface;
    wherein one or more of the series of ground engaging profiles, the series of longitudinally spaced guide-drive lugs, the carcass and the wheel path comprise a urethane material and wherein the plurality of track segments comprise a first track segment comprised substantially of the urethane material and a second track segment comprised substantially of an elastomeric material.

2. The track of claim 1, wherein the urethane material is a urethane reinforcement and is formed from a mixture comprising a castable urethane material consisting of a liquid which fills a mold and hardens to form the urethane reinforcement.

3. The track of claim 2, wherein the mold comprises a metal reinforcement therein and the castable urethane material is disposed adjacent the metal reinforcement.

4. The track of claim 3, wherein an adhesive is disposed at an interface of an elastomeric material and the castable urethane material.

5. The track of claim 1, wherein the series of ground engaging profiles is comprised of an elastomeric material and the carcass is comprised of the urethane material.

6. The track of claim 1, wherein the wheel path is comprised of the urethane material and the series of longitudinally spaced guide-drive lugs are comprised of an elastomeric material.

7. The track of claim 1, wherein the segment interface is configured to connect an adjacent track segment.

8. The track of claim 1, wherein the series of longitudinally spaced guide-drive lugs are for retaining the track on the vehicle and/or driving the vehicle.

9. The track of claim 1, wherein the urethane material is a track reinforcement and is a continuous structure comprising a base.

10. The track of claim 1, further comprising a mesh reinforcement layer.

11. The track of claim 1, further comprising a fabric reinforcement layer disposed in the urethane material proximate or upon upper faces of guide-drive lugs.

12. The track of claim 1, wherein the urethane material is a prepolymer comprising methylene diphenyl diisocyanate (MDI).

13. The track of claim 1, wherein the urethane material comprises a methylene diphenyl diisocyanate (MDI) terminated polycaprolactone prepolymer.

14. An endless vehicle track comprising a body comprising:
   a first track segment having:
   an outer surface comprising a first carcass and a first series of ground engaging profiles longitudinally spaced along the outer surface; and
   an inner surface comprising a first wheel path and a first series of longitudinally spaced guide-drive lugs;
   a second track segment having:
   an outer surface comprising a second carcass and a second series of ground engaging profiles longitudinally spaced along the outer surface; and an inner surface comprising a second wheel path and a second series of longitudinally spaced guide-drive lugs; wherein one or more of the first series of ground engaging profiles, the first series of longitudinally spaced guide drive lugs, the first carcass, the first wheel path, the second series of ground engaging profiles, the second series of longitudinally spaced guide-drive lugs, the second carcass, and the second wheel path, comprise a urethane material and wherein the first track segment includes a segment interface is configured to connect the first track segment to the second track segment.

15. The track of claim 14, wherein the first series of longitudinally spaced guide-drive lugs is connected to the inner surface using an adhesive.

\* \* \* \* \*